Sheet 3
3 Sheets.

Howard & Bousfield.
Harvester Rake.

Nº 71175.   Patented Nov. 19, 1867.

Inventors.
James Howard
Edward Tenney Bousfield
By their Attorney
J. Russell Parsons

UNITED STATES PATENT OFFICE.

JAMES HOWARD AND EDWARD TENNEY BOUSFIELD, OF BEDFORD, ENGLAND.

IMPROVEMENT IN HARVESTERS.

Letters Patent No. 71,175, dated November 19, 1867; patented in England November 20, 1866.

*To all whom it may concern:*

Be it known that we, JAMES HOWARD, of Bedford, in the county of Bedford, agricultural engineer, and EDWARD TENNEY BOUSFIELD, of the same place, engineer, have invented Improvements in the Construction of Reaping and Mowing Machines; and we do hereby declare that the following is a full and exact description of our said invention.

The object of this invention is to increase the efficiency of reapers and mowers; and to this end our invention relates, first, to an improvement in the arrangement of the mechanism for giving motion to the knife-bar of reapers and mowers; and, secondly, to improvements in the construction of the apparatus for delivering the cut crop from the machine; and, thirdly, in giving a variable speed to the reel in its circuit.

In the accompanying drawings, Figure 1 shows, in side elevation, a reaping-machine constructed according to our invention. Fig. 2 is a front elevation, and Fig. 3 is a plan view, of the same.

Referring to the first head of our improvements, we would remark that hitherto a difficulty has been experienced in bringing the crank-shaft which works the knife-bar sufficiently near the ground to keep the rod which connects the crank-shaft and knife-bar, and transmits motion to the latter, in the best position for efficiently delivering the thrust. Now, in order to effect this our first improvement, and at the same time to economize space, we adopt the following arrangement:

$a$ is a shaft, having its bearings in the off-side of the framing A, and set radially with respect to the axle of the carrying-wheels B B*. The shaft $a$ carries a pinion, $b$, which gears with the ring of bevel-teeth $b'$ on the driving-wheel B of the machine. At its outer end the shaft $a$ is fitted with a spur-wheel, $c$, which gears into and drives a pinion, $d$, on the crank-shaft $e$. This shaft $e$ is mounted parallel with the shaft $a$, and, like it, has its bearings in the side framing A. The two shafts $a$ and $e$ are therefore mounted in the same vertical plane. A rod, $f$, connects the crank-pin of the shaft $e$ with the knife-bar $g$, and, the lowest position of the crank-pin being nearly in a line with the knife-bar, a nearly direct thrust will be transmitted through the rod $f$ to the knife-bar. This arrangement also allows of the speed of the knife-bar being altered to suit various crops by simply changing the spur-gearing for wheels and pinions of different relative speeds.

The second head of the invention, which relates, as before stated, to improvements in the apparatus for delivering the cut crop, or sweeping it off when cut, at the side of the machine, has for its main object to increase the efficiency of the raking portion of the reel.

The bars $h\ h$ of the reel are formed of bent arms, supported at one end only, as is common with reel-bars, by their attached ends being inserted in radial sockets cast with the reel-boss.

$i$ is a bar, also fitted with rake-teeth, and supported at one end by a strong radial arm, $i^1$, which is capable of turning in its socket. To give great steadiness to this arm, it is prolonged past the center of rotation of the reel, and secured by an extension of the radial socket past that center, and to increase the stiffness of the rake-bar, a stay-rod, $i^*$, is used, to form a second connection between the arm $i^{*\prime}$ and rake-bar $i$.

Upon the radial arm $i'$ is keyed a miter-wheel, $k$, which gears into a similar but stationary wheel, $k'$, fixed on the frame-work. Through the center of this wheel $k'$ passes the shaft $l$ of the reel, and it is supported in bearings at the top of the framing. This shaft $l$ receives rotary motion through a chain-wheel, $l'$, mounted on the shaft, the wheel being driven by an endless chain, $m$, passing up from a chain-wheel, $n$, on the axle of the carrying-wheels.

From the above explanation it will be understood that the rake, in being carried round with the other arms of the reel, rotates also in its socket, and it is by this combined movement that the cut crop is swept forward and delivered at the side of the platform. Sometimes we dispense with the ordinary reel altogether, and substitute therefor gatherers, made to revolve in the same manner as described for the rake-arm.

In order further to increase the efficiency of the machine, the speed of rotation of the

M. C. HULL.
Hot-Air Furnace.

No 71,176. Patented Nov. 19, 1867.

Witnesses:

Inventor:

United States Patent Office.

MAURICE C. HULL, OF NEW YORK, N. Y.

Letters Patent No. 71,176, dated November 19, 1867.

---

IMPROVEMENT IN HEATING-STOVES.

---

The Schedule referred to in these Letters Patent and making part of the same.

---

TO ALL WHOM IT MAY CONCERN:

Be it known that I, MAURICE C. HULL, of the city and State of New York, have invented and made a certain new and useful Improvement in Heating-Furnaces or Stoves; and I do hereby declare the following to be a full, clear, and exact description of the same, reference being had to the annexed drawing, making part of this specification, wherein—

Similar marks of reference denote the same parts.

Figure 3:
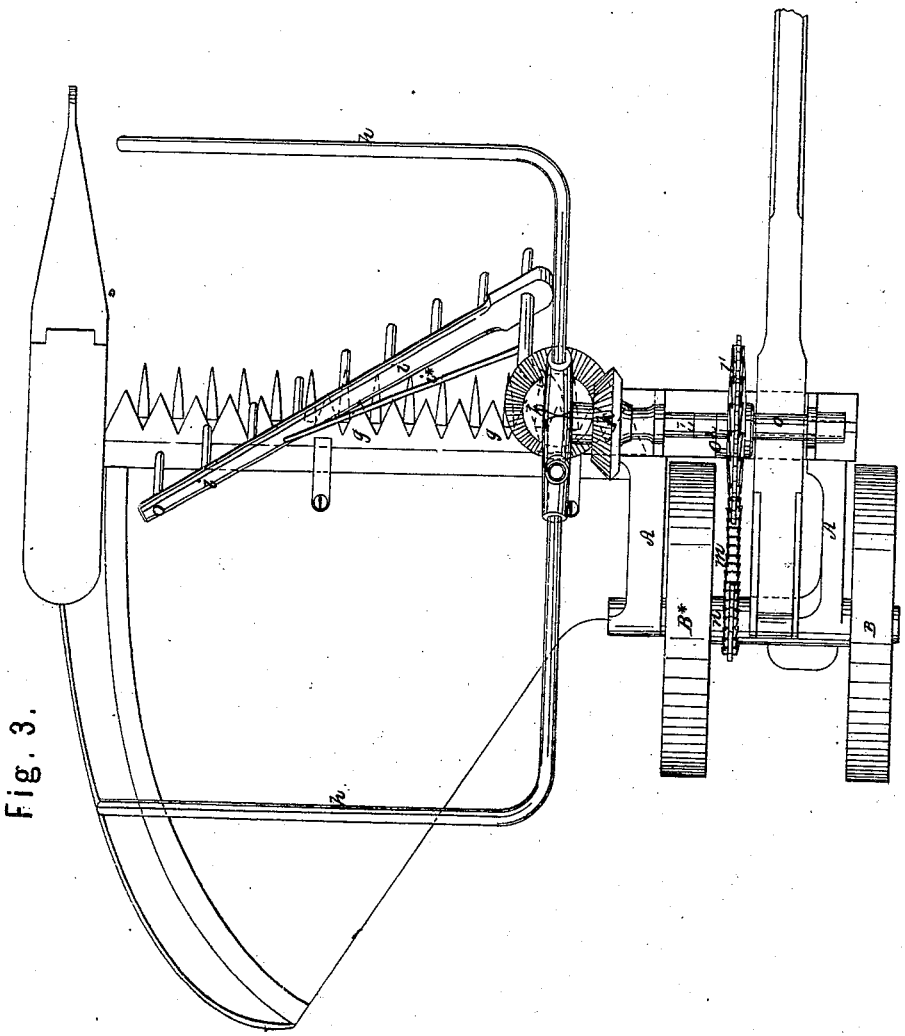
Figure 4:
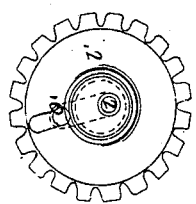
Figure 1:
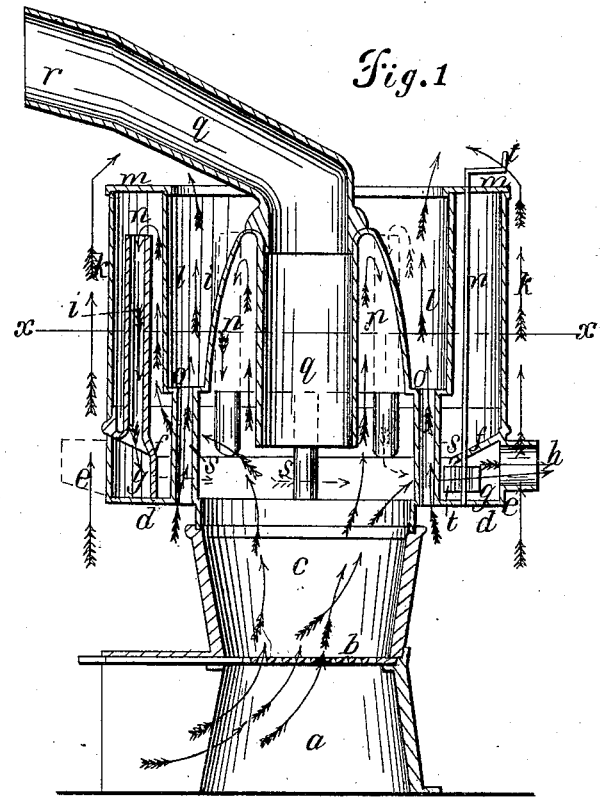
Figure 1 is a vertical section of the furnace.
Figure 2:
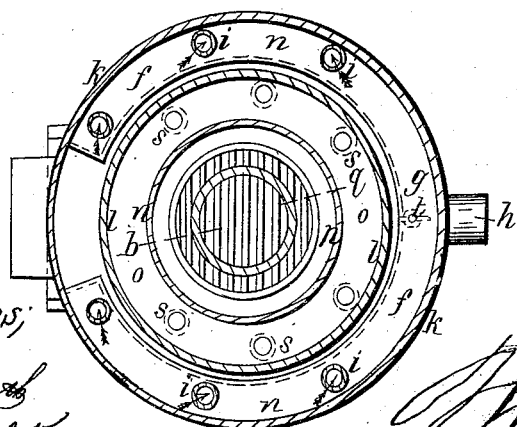
Figure 2 is a sectional plan of the same at the line $x$ $x$.

The object of my invention is to furnish a means for producing a perfect combustion of the fuel, and at the same time compel the products of combustion to travel through a considerable distance in the direction that their temperature would naturally induce the air to be heated, passing in contact with an extended surface.

In the drawing, $a$ is the ash-pit, $b$ the grate, $c$ the fire-pot, all of any usual or desired construction. Around the upper end of the fire-pot an annular plate, $d$, is employed that stands as a horizontal flange to said fire-pot. $e$ is a casing around the edge of this flange, within which is a conical or inclined plate, $f$, enclosing a flue, $g$, that opens at the back to the smoke pipe $h$. From the plate $f$ rise the tubular flues $i$ $i$, standing vertically, or nearly so, and forming a range over the flue $g$, into which they open at their lower ends, and the upper ends terminate as open mouths. I provide the double casing $k$ $l$ with the annular cover $m$, forming a cylindrical drum or ascending flue, $n$, that opens below the casing $l$ into the fire-chamber $c$. The casing $l$ is connected by a ring plate, $o$, to the dome $p$, within which is the hopper $q$ for fuel, from which the slide or chute $r$ passes to a door in a convenient position for supplying fuel. $s$ $s$ are air pipes between the plates $d$ and $o$, opening at their ends through them, and $t$ is a damper operated by a suitable rod that allows a direct draught from the fire to the smoke pipe $h$, as indicated by the black arrows. This direct draught is employed in kindling the fire. The furnace or heater may stand in any room or building for heating the same, or it may be enclosed in a brick or sheet-metal casing, and the heated air be passed to the apartments above. It will now be understood that the fire burns gradually below the hopper $q$, and that the products of combustion rise in the dome $p$, and are sufficiently retained to promote a perfect combustion before passing into the cylindrical flue $n$, in which they ascend and impart their heat to the plates $k$ and $l$ and air circulating in contact with such plates, and then they fall through the tubes $i$ $i$ into the flue $g$, and pass around said flue $g$, to the escape $h$. This arrangement produces a plenum in the flue $n$ and dome $p$, and compels the products of combustion to pass up to the top of the flue $n$, as the tubes $i$ $i$ prevent the heat passing directly off by the draught into the flue $g$. The tubes $s$ $s$, passing through the fire-chamber at a point where they become intensely heated, impart to the air passing through them a high temperature. The top plate $f$ of the flue $g$ being inclined, prevents the dust and ashes lodging; hence the furnace will be kept clean very easily, and the ashes will not accumulate and obstruct the transmission of heat. By this arrangement the gases as they become partially cooled descend through the pipes $i$, and pass off by the flue $g$, which is exposed externally to an ascending current of air, and thereby kept cool, so that there is very little loss by the escape of highly-heated gaseous products of combustion. The flue $g$ may be discontinued at one portion of its circumference, to allow for introducing a chute or door-frame to give access to the fire-chamber. This may be employed in cases where the supply-hopper is dispensed with.

What I claim, and desire to secure by Letters Patent, is—

1. The flue $g$, around, or partially around, the outside of the fire-chamber, substantially as set forth.

2. The inclined plate $f$, forming the top of the flue $g$, for preventing the lodging of ashes or fuel, as set forth.

3. I claim the pipes $i$, applied in substantially the manner specified, to cause the products of combustion to ascend toward the top of the furnace or stove, and then descend toward the base, for the purpose specified.

4. The flue $n$ and pipes $i$, in combination with the flue $g$, as and for the purposes set forth.

5. I claim the inclined plate $f$, through which the smoke-flues pass, substantially as and for the purposes specified.

In witness whereof I have hereunto set my signature, this third day of August, A. D. 1867.

M. C. HULL.

Witnesses:
GEO. D. WALKER,
CHAS. H. SMITH.